Patented Apr. 4, 1950

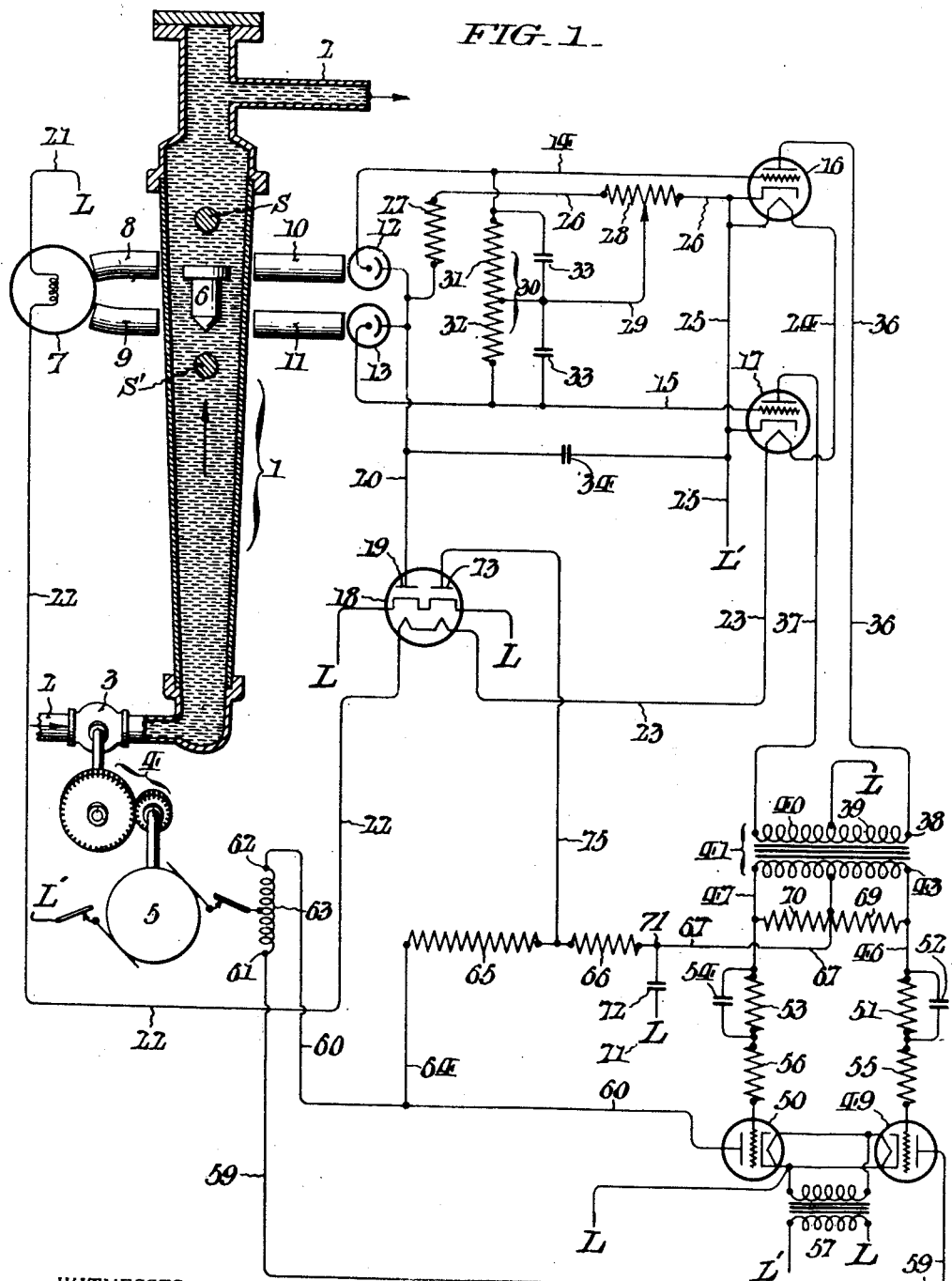

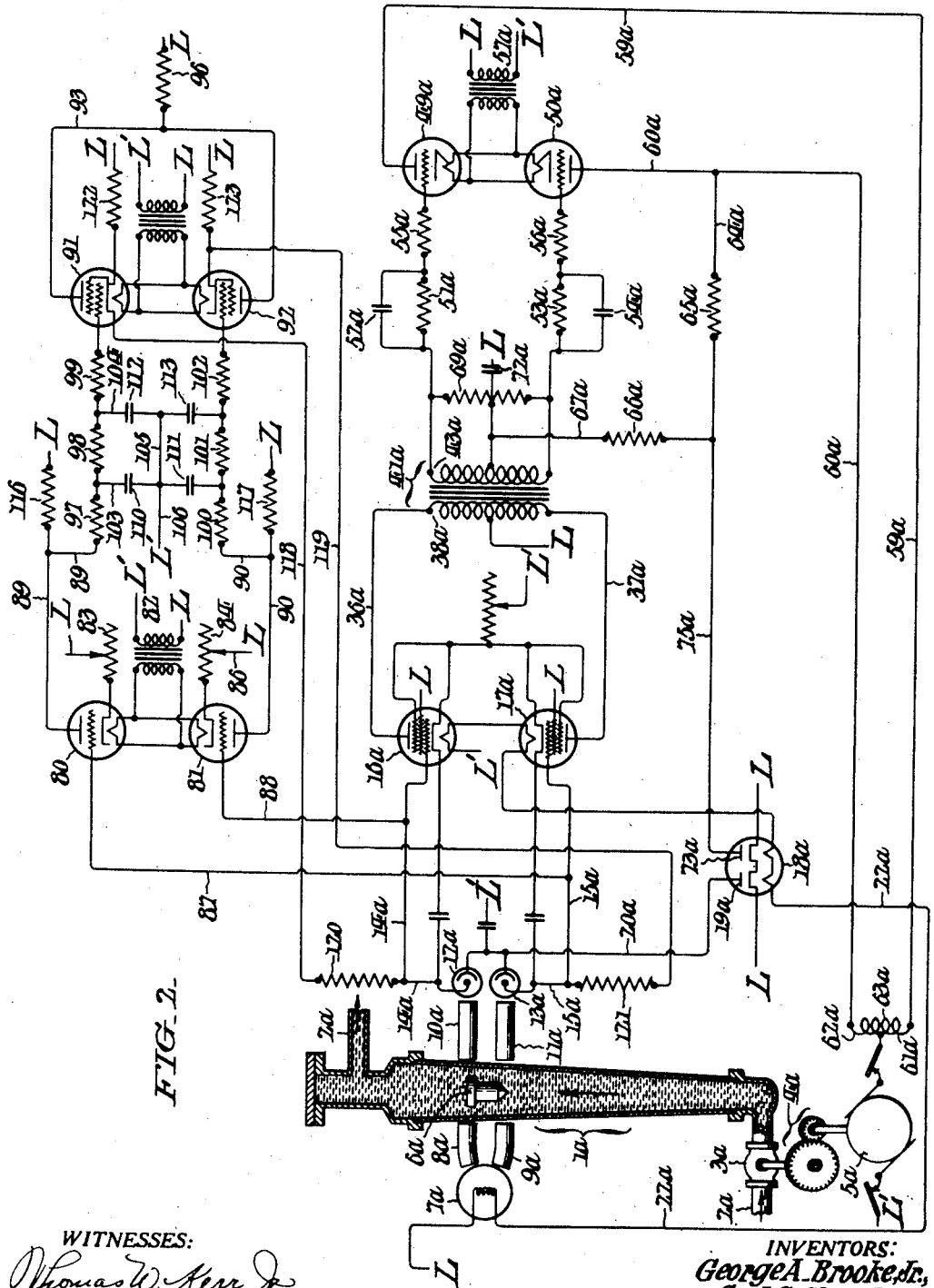

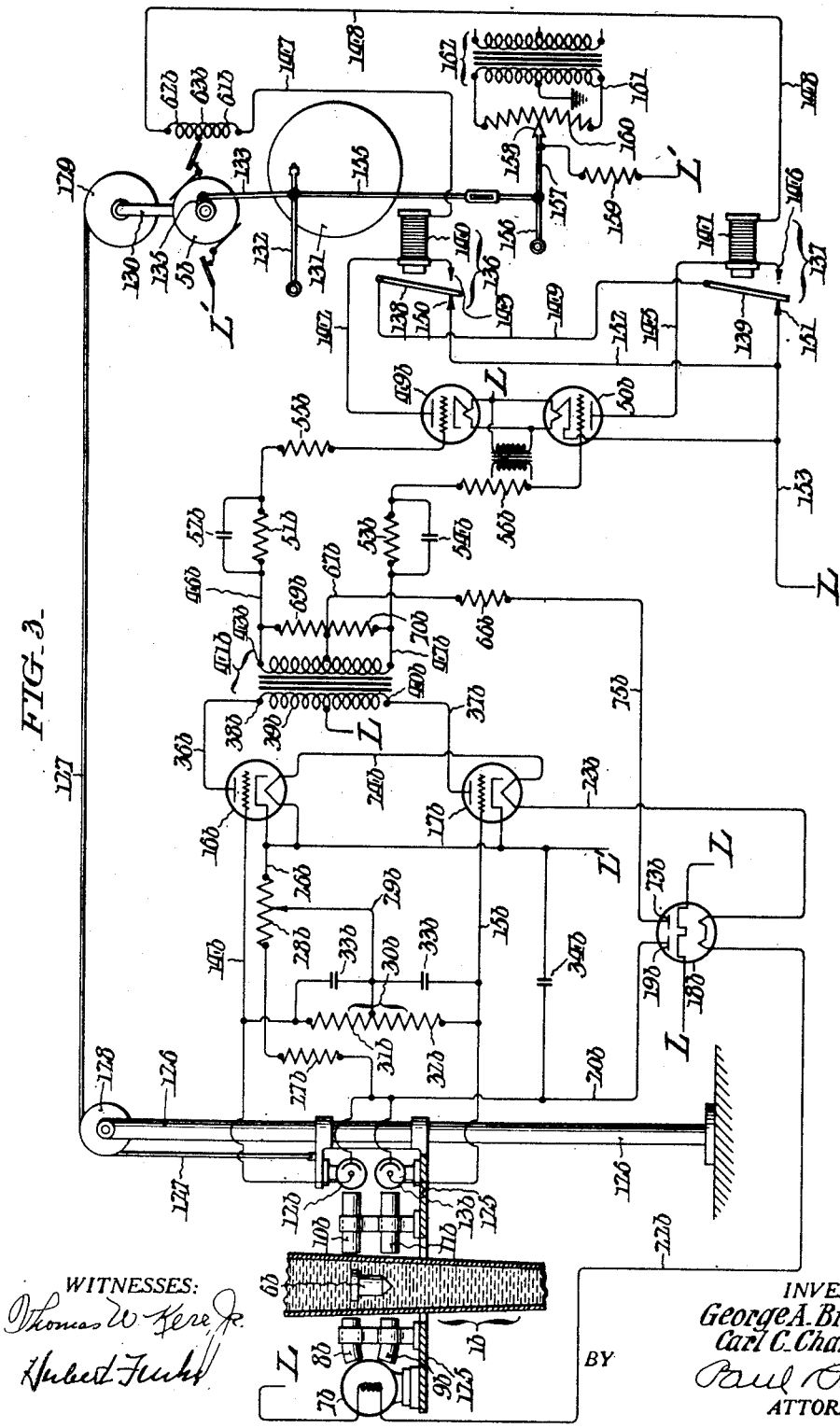

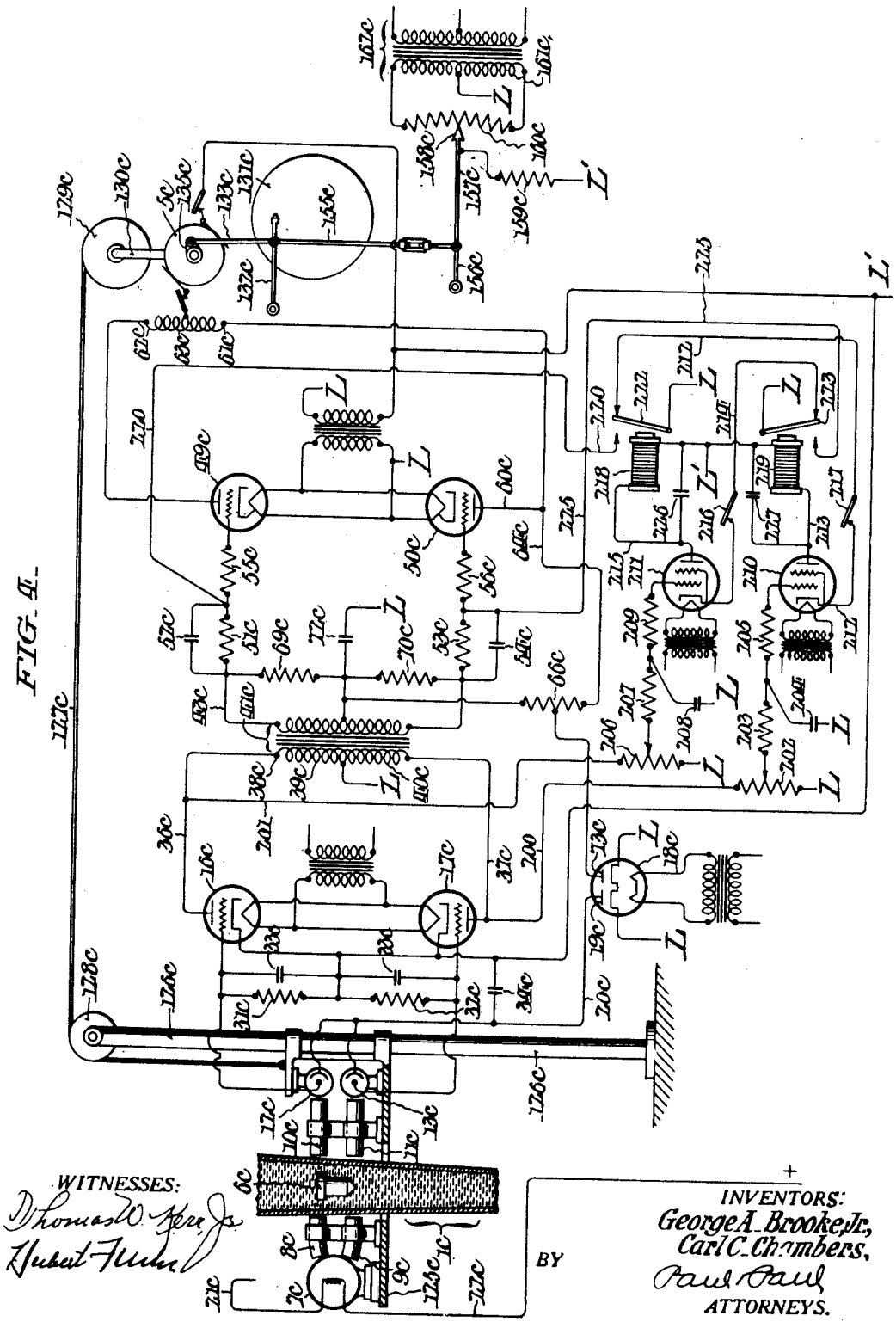

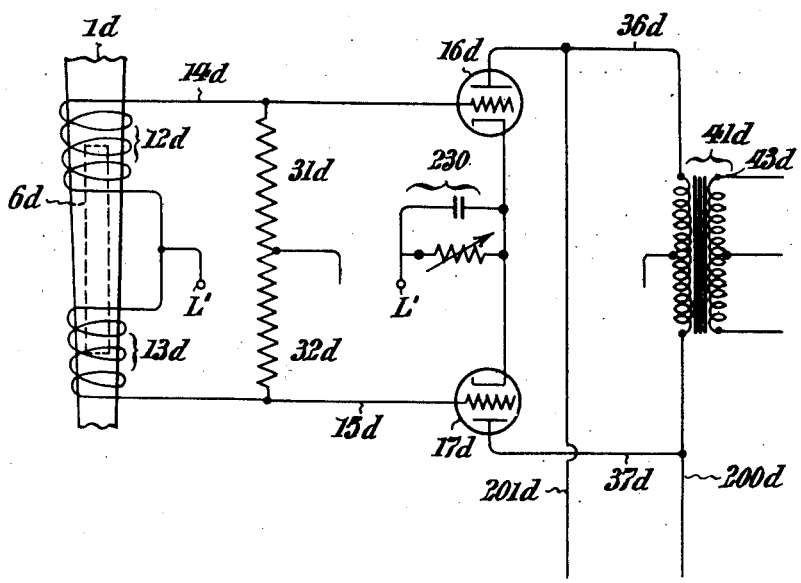

2,503,091

UNITED STATES PATENT OFFICE 2,503,091

ELECTRIC MOTOR CONTROL SYSTEM

George A. Brooke, Jr., Philadelphia, and Carl C. Chambers, Lansdowne, Pa., assignors to Brooke Engineering Company, Inc., Philadelphia, Pa., a corporation of Pennsylvania Application April 26, 1944, Serial No. 532,744

1 Claim. (Cl. 318—32)

This invention relates to control systems useful in governing various types of apparatus or machinery where extreme accuracy in control is necessary to insure uniformity in the product or in its output, and has reference more particularly to systems in which the control is effected with the aid of electronic devices.

One of the aims of our invention is to make it possible to confine the action of a movable part of an apparatus or machine to a relatively small range, with a view toward preventing excessive deviation thereof in one direction or the other from a desired normal or neutral position to the exclusion of attendant vibration or tendency to hunt. This desideratum is realized in practice as hereinafter more fully disclosed through provision of a control system which includes two detector elements, which may be in the form of photo-electric cells, induction coils, or even condensers, which are so spaced as to be both normally eclipsed or overlapped partially by the movable object; means sensitive to different electric signal impulses produced incident to slight movement of the object in either direction from a central neutral position relative to the two detector elements; and a compensated control means which, when influenced by the differences in the magnitude of the signal impulses, causes the actuation of a reversible device in the proper direction to operate the mechanism or means relied upon to bring about return movement of the object to said neutral position.

Another object of our invention is to make possible the reestablishment of the normal positional relationship between the detector elements and the movable object in the event that the latter passes in either direction entirely out of the range of said detector elements. This objective is realized in practice as also hereinafter more fully set forth, through provision of supplementary means in a system such as above characterized which is responsive to the magnitude of the signal impulses, and which is capable of prolonging a signal impulse when once set up to keep the reversible device moving in the proper direction until the object is again within the sphere of influence of the two detectors for reestablishment of its normal positional relationship to the detectors under modulated control.

Still another object of our invention is to make it possible to record the action of an object which is permitted to move at random. This end we achieve, likewise as hereinafter disclosed in detail, by utilizing the reversible means under compensative control to cause the two detector devices to follow the movements of the object, and at the same time to operate a suitable form of recorder.

We are of course aware that it is not new to employ various forms of detector elements to produce electric signal impulses proportional to the relative position of a movable object for control purposes. In the system of our present invention, however, the causes of error characteristic of prior art electronic control systems are eliminated through use of a "null" or normally balanced electric circuit arrangement in which two detector elements are included whose signals are normally balanced, together with the reversible device which will be actuated directionally as a consequence of unbalancing of the system through unequal impulses received from one or the other or both of said detectors. As will later appear, a control system of our invention will not be affected by variations in the applied voltage supply irrespective of the kind of detector elements employed, nor will a system embodying our invention and utilizing photo-electric cells as detectors be affected by changes in the light conductivity of the air, gas, liquid, transparent solids or surfaces which the light beams may be obliged to penetrate to illuminate the photo-electric cells, by variations in the light conductivity of the moving object, or by changes in the intensity of the light source.

Other objects and attendant advantages will appear from the following description of the attached drawings, wherein—

Fig. 1 is a diagrammatic view showing our improved control system arranged to maintain a movable object in a desired normal or neutral position between the two photo-electric cells.

Fig. 2 shows an arrangement generally like that of Fig. 1 with supplemental means for automatically returning the moving object to normal or neutral position in the event that it passes entirely out of the range of the light beams in either direction.

Fig. 3 shows a modified arrangement of our invention in which the light beams and the photo-electric cells are mounted for movement by a reversible motor means to follow the movable object; in which a recorder is at the same time operated by said motor means, and in which means is included for automatically restoring the movable object to normal or neutral position upon movement thereof in either direction beyond the range of the two light beams.

Fig. 4 shows an alternative embodiment of the system illustrated in Fig. 3, and

Fig. 5 shows an alternative embodiment of our invention in which the signal impulses are inductively produced through use of spaced coils as detectors.

*Embodiment illustrated in Fig. 1*

With more detailed reference first to Fig. 1 of the drawings, the character 1 designates a vertical transparent tube of a variable orifice flow meter which is interposed in a pipe-line 2 for upward passage through it of fluid under governance of a valve 3, the latter being operable through the medium of speed reduction gearing 4, by a reversible split field electric motor 5. A movable object in the form of a float 6 observable through the transparent wall of the metering tube 1 rises or falls in accordance with changes in the rate of the flow of the fluid within the limits prescribed by stops indicated at S and S'.

The control system which we have devised for governing the motor 5 in response to up-and-down movements of the float 6 (in this instance within the limits of the stops S, S') so that the rate of fluid flow through the metering tube 1 may be maintained substantially constant within a small range, includes a source 7 of light, which, as shown, may be an incandescent bulb. Light beams from the bulb 7 are directed by a pair of vertically-spaced parallel bars 8 and 9 of "lucite" or the like to pass through the transparent metering tube 1 in the region of the float 6 for transmission to a pair of axially aligned similar bars 10 and 11 at the opposite side of said tube. Positioned respectively adjacent the rear ends of the bars 10 and 11 are detector elements in the form of photo-electric cells 12 and 13 (which may be of the 929 type) which are affected by changes of light intensity when the float 6 rises or falls within the metering tube 1 from the normal poistion in which it is illustrated as partially eclipsing both light beams. The anodes of the photo-electric cells 12 and 13 are respectively connected through conductors 14 and 15 to the control grids of a pair of amplifying tubes 16 and 17 which may be of the type 6J5. At 18 is indicated a two-plate rectifier tube (which may be of the type 6H6) whereof the plate or anode 19 is connected by a conductor 20 to the cathodes of the photo-electric cells 12 and 13. The filaments of the light bulb 7 and the tubes 16, 17 and 18 are connected in series in a circuit 21, 22, 23, 24, 25 which supplies the heating current. Serially arranged in the conductor 26 which connects the cathodes of the photo-electric tubes 12 and 13 with the cathode of the amplifying tube 16 is a fixed resistance 27 of 1,000,000 ohms, and a 15,000 ohm potentiometer 28 whereof the slide is connected, through a conductor 29, with the mid point of a resistance 30 extending across the conductors 14 and 15, the subdivisions 31 and 32 of the last mentioned resistance being each of the order of 5 megohms. The potentiometer 28 permits adjustment of the grid bias of the amplifying tubes 16 and 17, while the condensers shown at 33 serve to smooth out ripples in the voltages delivered to the grids of said tubes, the resistances 31 and 32 being relied upon to serve as grid returns. Another condenser 34 connected across the conductors 20 and 25 prevents surges in the direct current supply to the cathodes of photo-electric cells 12 and 13. The remainder of the control system in Fig. 1 is identical with that disclosed in a copending U. S. Patent Number 2,371,590, patented March 13, 1945, filed by us on June 6, 1942. Thus it further includes conductors 36 and 37 which connect the plates or anodes of the amplifiers 16 and 17 with the end of the primary coil 38 of a push-pull transformer 41, the mid point of said coil being connected to one side 42 of a current supply line. The ends of the secondary coil 43 of the transformer 41 are respectively connected through conductors 46 and 47 with the grids of thyratrons 49 and 50 (which may be of the type F. G. 17), with interposition of resistance-condenser grid networks 51, 52 and 53, 54 and fixed resistances 55 and 56. The resistances 51 and 53 may respectively be of the order of 50,000 ohms, the condensers 52 and 54 of the order of .25 microfarad, and the resistances 55 and 56 also of the order of 50,000 ohms. The filaments or cathodes of the thyratrons 49 and 50 are heated by transformed current supplied from a source 57. Conductors 59 and 60 connect the plates or anodes of the thyratrons 49 and 50 with the opposite ends of the subdivisions 61 and 62 of the split field coil 63 of the reversible motor 5. Leading from the plate or anode of the thyratron 50 is a feed-back conductor 64 which terminates at the mid point of the secondary coil 43 of the push-pull transformer 41 and which has interposed in it resistances 65 and 66 of 115,000 and 5,000 ohms, respectively. Resistances 69 and 70 of 500,000 ohms each are respectively connected across the conductors 46, 47 and the conductor 67 which latter is connected at 71 to one side L of a supply line through a condenser 72 of .25 microfarad capacity. From the plate or anode 73 of the rectifying tube 19 extends a wire 75 which connects with the feedback conductor 64 at a point between the resistances 65 and 66, and provides the necessary negative biasing voltage.

Normally the photo-electric cells 12 and 13 are eclipsed to the same extent by the float 6, so that the biasing effects on the grids of the two amplifying tubes 16 and 17 will also be the same. In this connection it is pointed out that with the float in the neutral position, the bias adjustment 28 is set for emission approximately between midway and cut-off. From this it follows that the pulsating plate output voltages from the amplifiers 16 and 17 delivered to the opposing subdivisions 39 and 40 of the primary coil 38 of the push-pull transformer 41 will in turn be equal normally but in opposition and therefore cancel each other, and therefore do not affect the secondary of the transformer. Accordingly the system is normally balanced with the motor 5 quiescent. Either a slight rise or fall of the float 6 from its normal position in the flow tube 1 will however result in causing a disturbance or change in the system as will be presently explained, whereby the motor 5 will be operated in the proper direction to actuate the valve 3 for increased or decreased flow of the fluid in the metering tube 1 and thereby cause said float to be returned to its normal position. Let it be assumed that due to a drop in the rate of flow of the fluid the float 6 falls slightly in the metering tube 1. As a consequence more light will impinge upon the photo-electric cell 12 and less upon the photo-electric cell 13 with attendant production of a signal impulse whereby the potential on the grid of the amplifier 16 will be rendered more negative and that of the amplifier 17 rendered less negative. The plate output of the amplifier 17 will therefore dominate that of the amplifier 16 in its effect upon the push-pull transformer 41 and cause firing of the thyratron 50 with attendant delivery of current to the subdivision 62 of the field coil 63 of the motor 5 in the same manner as described in the application supra, whereby said motor is operated in the proper direction to further open the valve 3, with resultant increase in the flow of fluid in the metering device 1 and lifting of the float 6 toward its normal position. While this is being accomplished, the light impinging upon the photo-electric cell 12 will be gradually decreased. Due to attendant change in the grid potential of the amplifier 17 and in turn of the thyratron 50, the latter will eventually de-ionize and resume its normal dormant condition. Slight rise of the float 6 in the metering tube 1 will, on the other hand, be attended by increase in the light impinging upon the photo-electric tube 13, which, in a like manner, will result in impression of a signal voltage upon the thyratron 49 whereby the latter is caused to fire and permit current flow to the subdivision 61 of the field coil of the motor 5 for operation of said motor now in the opposite direction. The fluid flow in the metering tube 1 will thus be decreased until the float 6 again resumes its normal position. In either instance, due to the compensative action of the feed-back network 60, 64, 65, 66, 67 and resistances 69 and 70, movement of the motor 5 will be interrupted as the float approaches its neutral position so as to preclude overtravel of the latter and hunting in the manner fully set forth in U. S. Patent 2,154,375 granted to Carl C. Chambers, one of the present applicants.

*Embodiment illustrated in Fig. 2*

In this embodiment of our invention, pentodes 16a, 17a of the type 6SK7 are employed in lieu of the triodes 16, 17 of the first described embodiment, for amplifying the signal impulses received from the photo-electric cells 12a, 13a incident to rise or fall of the float 6a in the metering tube 1a. Except as presently pointed out, the control system of Fig. 2 is substantially identical with that of the first described embodiment, wherefore all the corresponding elements have been identified by the same reference numerals previously employed with the addition in each instance of the letter "a" for convenience of ready distinction and preclusion of the necessity for repetitive description. In this instance, the metering tube 1a is devoid of stops for limiting the movements of the float 6a. For the purpose of producing signal impulses to insure continued operation of the valve actuating motor 5a in the proper direction in the event that the float 6a moves either up or down entirely beyond the range of the photo-electric cells 12a, 13a, we have provided supplementary control means in association with the portion of the system which is identical to that of the first described embodiment and which may be referred to as the primary control means. As shown, this supplemental control means includes an additional pair of amplifiers 80 and 81 (which may be of the type 6SN7) whereof the filaments are heated by transformed current from a circuit 82, and the cathodes connected through adjustable resistances 83 and 84 in circuits 85 and 86. The grids of the auxiliary amplifiers 80 and 81 are respectively connected with the control grids of the primary amplifiers 17a, 16a by the conductors 87 and 88. The output voltages from the plates or anodes of the auxiliary amplifiers 80 and 81 are impressed, by way of conductors 89 and 90, upon the control grids of a pair of auxiliary thyratrons 91 and 92 (which may be of the 2050 type), while the plates or anodes of the latter tubes are connected by a conductor 93 to a supply line 95 through a resistance 96 of 20,000 ohms. Interposed in the conductors 89 and 90 are resistors 97, 98, 99 and 100, 101, 102; and extending between said conductors at points between these resistors are conductors 103 and 104, which are connected to the A. C. supply line 105, 106. Interposed in the conductors 103 and 104 are condensers 110, 111 and 112, 113 each of 5 microfarads capacity. The resistors 97, 98 and 100, 101 may each be of the order of 100,000 ohms, and the resistors 99 and 102 each of 5 megohms. As shown, the conductors 89 and 90 are in circuit with current supply sources respectively through resistors 116 and 117 which may be of the value of 10,000 ohms each. Extending from the cathodes of the auxiliary thyratrons 91 and 92 to the conductors 14a and 15a which lead to the control grids of the primary amplifying tubes 16a, 17a are feed-back wires 118, 119 with interposed resistors at 120, 121 of 5 megohms each.

In the event that the float 6a drops to a level such that the photo-electric cell 12a is exposed to nearly the maximum amount of light from the bar 10a, the output of the auxiliary amplifier 81 will be reduced due to the greater negative bias on its control grid. The reduced flow through the tube 81 and the resistor 117 under these conditions will cause the grid of the auxiliary thyratron 92 to become more positive. Since the tube 92 will fire only when the negative potential on its grid decreases, adjustment is made at 86 which will cause firing just before the photo-electric cell 12a is fully exposed to the light beam from the bar 10a. Upon firing of the auxiliary thyratron 92, current will flow through its cathode and a 5 megohm resistor at 123, thereby causing the voltage in the line 119 to become more positive, with the result that the output from the primary amplifier and thyratron 17a and 80 will be increased. When the float 6a has dropped to the point where both of the photo-electric tubes 12a, 13a are fully exposed to the light, the auxiliary amplifier 80 will emit sufficiently to prevent the auxiliary thyratron 91 from firing because of the plus voltage fed from L, resistors 123, 119, 121, 15a and 87 to grid of 80 to increase its emission and thereby prevent thyratron 91 from firing, and the primary amplifier 17a will emit enough to cause an unbalance in the flow through the primary coil 38a of the push-pull transformer 41a, so that the motor 5a will keep running in the proper direction to further open the valve 3a for increased fluid flow in the metering tube 1a. As the float 6a rises in consequence and shades the photo-electric tube 12a, the grid voltages of the primary and auxiliary amplifiers 16a and 81 will be increased, thereby causing auxiliary thyratron 92 to cease firing, with attendant removal of the impulse on the grid of amplifier 17a and restoring the system to its original condition. The performance of the control in the event that the float 6a rises beyond the province of both photo-electric cells 12a and 13a will be the same as just described but with the auxiliary amplifier 80 effective upon the auxiliary thyratron 91 to keep the motor 5a running in the opposite direction until normal conditions again prevail in the system. Accordingly the supplemental control means is interlocked with the primary control means and becomes effective somewhat before movement of the float 6a in either direction wholly beyond the photo-electric cells 12a, 13a to bring about the return of said float 6a after it is entirely brought back into the province of said cells, whereupon the control is again taken over by the primary means and the float again restored to its normal or neutral position without attendant overthrow or hunting due to the modulating characteristics of said primary control means.

*Embodiment illustrated in Fig. 3*

In this embodiment of our invention, the light bulb 7b, the beam-conducting bars 8b—11b and the photo-electric cells 12b, 13b are all mounted upon a carriage 125 which is confined to up-and-down movement on a guide post 126 for capacity to follow the movements of the float 6b of the fluid-flow metering device 1b. As shown the carriage 125 is arranged for actuation through a cable 127 which passes over a guide sheave 128 at the top of the post 126 and a drum 129 whereto the opposite end of said cable is connected, by a reversible electric motor 5b to the shaft 130 of which said drum is secured. At 131 is conventionally indicated a recorder whereof the marking stylus arm 132 is operated, through a link 133, from a crank 135 on the shaft 130 of the motor 5b. In the control system of Fig. 3 it will be observed that in association with the thyratrons 49b and 50b, I employ relays 136 and 137 whereof the switch armatures are indicated at 138 and 139 and the actuating magnet coils at 140 and 141. As shown, one end of the plate or anode of the thyratron 49b is connected, through a conductor 142, to one end of the coil 140 and to the contact 143 of the relay 136, and the plate of thyratron 50b connected through a conductor 145 to one end of the coil 141 and to the contact 146 of relay 137, said relay coils being respectively in series with the field of the motor 5b through conductors 147 and 148. The pivots of the armatures 138, 139 of relays 136, 137 are connected by a conductor 149, and, as shown, normally engage the contacts 150 and 151 which are connected, one to the other, by a conductor 152, and which, together with the cathodes of thyratrons 49b, 50b, are connected to one side L of a supply line through a conductor 153. Coupled by means of an adjustable link 155 with the stylus arm 132 of the recorder 131 is an arm 156, which, with interposition of insulation at 157, carries a slide contact 158. As shown, this contact 158 is connected to the other side L' of the supply line through a resistor 159 and is adapted to be shifted relative to the central point of a resistance 160 whereof the opposite ends are connected to the divided primary coil 161 of a push-pull transformer 162. This push-pull transformer 162 is intended to be utilized like the push-pull transformer 41 of Fig. 1 in actuating a valve (not shown) in Fig. 3 to control the rate of flow of the fluid through the metering tube 1b in the same manner and through instrumentalities similar to those illustrated in Fig. 1. Upon deviation of the float 6b downward, for example, the photo-electric cell 13b will receive less light and the photo-electric cell 12b will receive more light. The signal impulse thus produced will cause an unbalance in the divided primary of the push-pull transformer 41b. This unbalance sends a signal impulse to the thyratron 50b causing it to fire. The motor 5b is thus operated by current flow from the ground through wire 153 cathode of thyratron 50b through the plate to wire 145 through the coil 141 to wire 148, the subdivision 58b of the split field of said motor and through the armature to the L' side of the supply line. Simultaneously this same current flow passing through the coil 141 of relay 136 energizes this coil to pull the armature 139 into engagement with the contact 146.

It will be observed that it is no longer necessary for the thyratron 50b to be firing since the armature 139 is held down by current flowing from ground through wire 153, 152, contact 150, armature 138, wire 149, armature 139, contact 146 through the coil as before through the motor. If the float passes down beyond the range of the light beam 11b, the motor 5b will remain in operation in a direction to move the carriage 125 downward into the influence of the float. When this has occurred to the point where the float 6b is relatively above the changed neutral position, there will now be more light on photo-electric cell 13b and less light on photo-electric cell 12b. This produces in the push-pull transformer 41b a signal of a reverse character to actuate thyratron 49b so that current flows from L through the cathode, the plate, wire 142, coil 140, wire 147, and the other subdivision 61b of the field coil of motor 5b causing the latter to run in the reverse direction. Simultaneously this current flow through coil 140 of relay 136 pulls armature 138 into engagement with contact 143 thereby disengaging the ground connection from the armature 139 of relay 137 and causing coil 141 of said relay 137 to be deenergized. At the same time energizing of coil 140 of relay 136 locks in the armature 138 in the same manner as described above for coil 141. The lock-in circuit starts from ground through line 153, contact 151, armature 139, wire 149, contact 143 through the coil 140, wire 147, coil 61b of the motor 5b to the L side of the line.

*Embodiment illustrated in Fig. 4*

In this embodiment of our invention, the motor 5c moves the carriage 125c to follow the float 6c to actuate a recorder 131c in the manner as described in connection with the embodiment of Fig. 3. Except as will be presently pointed out, the control system which actuates the motor 5c, is identical to that of the first described embodiment, wherefor all corresponding elements have been identified by the same reference numerals previously employed with the addition, however, in each instance of the letter c for convenience of ready distinction and to here again preclude the necessity for repetitive description. In this instance the center tap between coils 31c and 32c is directly connected to L without the bias adjustment (potentiometer 28) shown in Fig. 1, the tubes 16c and 17c being biased by the plate 19c of rectifier 18c through the photo-electric cells 12c and 13c which normally emit. For the purpose of setting up signal impulses to insure continued operation of the carriage actuating motor 5c in the proper direction when the element 6c moves either up or down entirely out of the range of the photo-electric cells 12c, 13c we have here provided supplemental control means which includes two thyratrons 210 and 211 (which may be of the type 2050) whereof the filaments and cathodes are heated by transformed current as conventionally shown, and whereof the plates are respectively connected by conductors 213 and 215 to the coils of electro-magnetic relays 219 and 218 to the L' side of the supply line. The armatures of relays 219 and 218 are connected to the grounded side of the line. When both relay coils are deenergized the armature of relay 219 is connected through conductor 214 to the cathode of the tube 211 with the limit switch 216 interposed, and the armature of relay 218 is connected to the cathode 212 of tube 210 with the limit switch 217 interposed. The control grid of tube 210 is connected through resistors 205 and 203 to slide wire of potentiometer resistor 202. Between resistors 205 and 203 is condenser 204 connected to L. The resistances 203 and 205 and condenser 204 serve to filter the output from the plate of tube 17c while the variable resistance 202 serves to adjust the amount of negative bias developed by tube 17c so that the degree of emission from the latter will determine whether thyratron 210 will fire or not. The elements 206, 207, 208 and 209 perform the same functions for tube 16c and thyratron 211. One end of potentiometer 202 is connected to L side of the line, while the other end is connected by means of conductor 200 to the plate of the amplifying tube 17c. Similarly one end of potentiometer 206 is connected to L, and the other end connected through a conductor 201 to the plate of amplifying tube 16c. When the coil of relay 219 is energized the armature of this relay connects the L side of line to the point between resistors 53c and 56c through conductor 225. When the coil of relay 218 is energized the armature of its coil connects the L side of the line to the point between resistors 51c and 55c through conductor 220.

In the event that the float 6c drops to a level such that the photo-electric cell 12c is exposed to a little more light than the photo-electric cell 13c, the thyratron 49c will fire and operate the motor 5c with compensation as described in connection with Fig. 1. If, however, the float 6c drops further to a point such that the photo-electric cell 12c is exposed to nearly the maximum amount of light from the bar 10c, the negative bias from the anode of said cell will increase negative voltage potential on the grid of amplifier 16c. This will reduce flow of current from the plate of amplifier 16c. The connection from the L side of the line, through 40c, through the subdivision 39c of the primary coil point 38c of push-pull transformer 41c, conductor 201, potentiometer resistor 206 and resistors 207 and 209 to control grid of thyratron 211 will remove what remains of the negative bias which has kept said thyratron from firing, the condenser 208 serving to smooth out the ripples in the current. The firing of thyratron 211 energizes the coil of relay 218 and causes the armature 222 to connect the L side of line through conductor 220, resistor 55c to the grid of thyratron 49c where it removes the negative bias (if any) on this grid and keeps this thyratron firing and the motor 5c running in the proper direction to raise the float 6c. If nevertheless the float 6c continues to drop, the photo-electric cell 13c will also become illuminated but cannot cause actuation of relay 219 because of the interlocking action of relay 218, wherein lifting of the armature 222 breaks the connection from the L side of line to the cathode of thyratron 210.

Conversely, when the float 6c rises to a level such that the photo-electric cell 13c is exposed to a little more light than the photo-electric cell 12c, the thyratron 50c will fire and likewise cause operation of the motor 5c but in the opposite direction. If the float 6c moves still further upward so that the photo-electric cell 13c is exposed to nearly the maximum amount of light from the bar 11c, the negative bias from the anode of said cell will cause more negative potential on the grid of the amplifier 17c with consequent reduction in the flow of current from the plate of the latter. The connection from the L side of the line through the subdivision 40c of the primary coil of transformer 41c, conductor 37c, potentiometer resistor 202, resistors 203 and 205 to control grid of thyratron 210 will remove the remains of the negative bias which has kept said thyratron from firing. The firing of thyratron 210 energizes the coil of relay 219 and causes the armature 223 to connect the ground side of line through conductor 225, resistor 56c to the grid of thyratron 50c where it removes the negative bias, if any, on this grid and prevents said thyratron from firing and the motor 5c running in the opposite direction to lower the float 6c. If, the float 6c continues to rise, the photo-electric cell 12c will also become illuminated but cannot cause actuation of relay 218 by reason of the interlocking action of the relay 219 wherein lifting of the armature 223 breaks the connection from the L side of the line to the cathode of thyratron 211.

If the service voltage should be interrupted and return at a time when the float 6c was not in position to influence the light received by either photo-electric cell, one or the other, but not both of the relays 219 and 218 will be energized as both thyratrons 210 and 211 will have grids of approximately the same potential as their respective cathodes, but the first relay to operate will disconnect the cathode of the thyratron which is connected to the other relay. The capacity of condensers 226, 227 will change the time of operation slightly. Now if, for example, relay 219 should close, relay 218 cannot close, and if motor 5c starts to run in the wrong direction, i. e., to cause movement of the float 6c away from neutral, it will run until the limit switch shown at 217 opens the connection to the cathode of tube 210, the relay 219 will thus be de-energized and its armature 223 will connect the L side of the line to the cathode 214 of the tube 211, and the coil 218 will be energized thereby running the motor in the opposite or correct direction to cause return of the float 6c to neutral position.

*Embodiment shown in Figure 5*

In this form of my invention, two spaced coils 12d and 13d are provided to serve as detectors, said coils encircling the flow tube 1d and having their contiguous ends connected to one side L' of a current supply. The outer ends of the detector coils 12d and 13d are respectively connected through conductors 14d and 15d with the grids of the amplifying triodes 16d and 17d of which the cathodes are also connected to the side L' of the supply line of which the other side is shown at L. A resistance-condenser network at 230 renders the tubes 16d and 17d self-biasing. The output from the tubes 16d and 17d is impressed by way of conductors 36d and 37d upon the divided primary coil of the push-pull transformer 41d. Normally with the float 6d in neutral position, the outputs from the tubes 16d and 17d will be equal and oppose each other in the primary of the transformer 41d. However, when the float 6d moves downward, for example, the signal impulse produced causes the grid of tube 16d to become more positive, and the grid of the tube 17d to become more negative due to the lesser choking action of said float in the detector coil 12d. The output from the tube 16d will thus predominate that of the tube 17d as in the form shown in Fig. 4. Similarly rise of the float 6d from neutral position will result in predominance in the output from the tube 17d. The connections from the divided secondary coil of the transformer 41d to the modulated control and the connections from the conductors 36d, 37d through the leads 200d, 201d to a supplemental or lock-in control may be the same as shown in Fig. 4. In a similar manner, the detector arrangement of Fig. 5 may be substituted for the photo-electric cell detector schemes shown in Figs. 1-3.

From the foregoing it will be apparent that we refer to control of the relative position of the float to the photo-electric elements whether the float is moved in respect to the photo-electric elements or said elements in respect to the float. The various forms in which we have herein illustrated our invention are simple, and can be relied upon for dependable service over long periods of use. These several forms are to be considered as typical of other possible forms within the scope of the oppended claim, wherein detector devices other than photo-electric cells or coils may be employed; for example, spaced condensers to produce signal impulses through capacity variations incident to relative movement between them and the object being controlled.

Having thus described our invention, we claim:

A control system of the character described for controlling a reversible electric motor in response to changes in the position of a movable object, said system including a primary control means comprising a light source and a pair of photoelectric cells both partially eclipsed by the movable object when in its normal position and positioned so that on movement of the object in either direction within the range of both of said cells the eclipse of one cell is increased while the exposure of the other cell to the action of said light source is correspondingly increased, and so positioned that said movable object may pass in either direction beyond the range of one of said cells thereby exposing it fully to said light source while completely eclipsing the other of said cells, and supplemental means responsive to said fully exposed cell whereby the energization of said motor is maintained to return said movable object even though the other of said cells may likewise become fully exposed to said light source until said movable object is returned to a position within the range of both of said cells.

GEORGE A. BROOKE, Jr.
CARL C. CHAMBERS.

REFERENCES CITED

The following references are of record in the file of this patent:

UNITED STATES PATENTS

| Number | Name | Date |
|---|---|---|
| Re. 20,476 | Wilson et al. | Aug. 17, 1937 |
| 1,877,810 | Chamberlain | Sept. 20, 1932 |
| 1,999,646 | Wittkuhns | Apr. 30, 1935 |
| 2,069,959 | Kuljian | Feb. 9, 1937 |
| 2,070,617 | Offutt | Feb. 16, 1937 |
| 2,091,303 | Brelsford | Aug. 31, 1937 |
| 2,132,677 | Chance | Oct. 11, 1938 |
| 2,147,422 | Bendz | Feb. 14, 1939 |
| 2,154,375 | Chambers | Apr. 11, 1939 |
| 2,182,717 | Chance | Dec. 5, 1939 |
| 2,317,807 | Ryder | Apr. 27, 1943 |
| 2,330,427 | Hornfeck | Sept. 28, 1943 |
| 2,346,117 | Stabler | Apr. 4, 1944 |
| 2,357,745 | Kliever | Sept. 5, 1944 |
| 2,376,459 | Stevens | May 22, 1945 |

FOREIGN PATENTS

| Number | Country | Date |
|---|---|---|
| 408,936 | Germany | Jan. 29, 1925 |
| 604,113 | Germany | Oct. 15, 1934 |